(12) United States Patent
Geiger et al.

(10) Patent No.: US 8,365,595 B2
(45) Date of Patent: Feb. 5, 2013

(54) ROTATION RATE SENSOR

(75) Inventors: Wolfram Geiger, Freiburg (DE); Peter Leinfelder, Ehrenkirchen (DE); Guenter Spahlinger, Stuttgart (DE); Julian Bartholomeyczik, Freiburg (DE)

(73) Assignee: Northrop Grumman LITEF GmbH, Freiburg (DE)

( * ) Notice: Subject to any disclaimer, the term of this patent is extended or adjusted under 35 U.S.C. 154(b) by 452 days.

(21) Appl. No.: 12/451,998

(22) PCT Filed: Mar. 28, 2008

(86) PCT No.: PCT/EP2008/002504
§ 371 (c)(1),
(2), (4) Date: Dec. 11, 2009

(87) PCT Pub. No.: WO2009/003543
PCT Pub. Date: Jan. 8, 2009

(65) Prior Publication Data
US 2010/0139399 A1 Jun. 10, 2010

(30) Foreign Application Priority Data
Jun. 29, 2007 (DE) .......................... 10 2007 030 120

(51) Int. Cl.
*G01C 19/56* (2006.01)
(52) U.S. Cl. .................................. 73/504.14; 73/504.12
(58) Field of Classification Search ............... 73/504.14, 73/504.12, 504.16, 504.02, 504.04
See application file for complete search history.

(56) References Cited

U.S. PATENT DOCUMENTS

| | | | |
|---|---|---|---|
| 6,691,571 B2 | 2/2004 | Willig et al. | |
| 6,705,164 B2 | 3/2004 | Willig et al. | |
| 7,036,372 B2 * | 5/2006 | Chojnacki et al. | 73/504.12 |
| 7,134,337 B2 * | 11/2006 | Willig et al. | 73/504.12 |
| 7,240,552 B2 * | 7/2007 | Acar et al. | 73/504.12 |
| 7,340,954 B2 * | 3/2008 | Handrich | 73/504.04 |
| 8,011,244 B2 * | 9/2011 | Diem | 73/504.12 |

FOREIGN PATENT DOCUMENTS

| | | |
|---|---|---|
| DE | 19530007 | 2/1997 |
| EP | 1515119 | 3/2005 |
| EP | 1762823 | 3/2007 |
| EP | 1793202 | 6/2007 |
| WO | 9535798 | 12/1995 |
| WO | 0216871 | 2/2002 |
| WO | 02059548 | 8/2002 |
| WO | 02066929 | 8/2002 |
| WO | 2005066584 | 7/2005 |
| WO | 2005066585 | 7/2005 |

* cited by examiner

*Primary Examiner* — Helen C. Kwok
(74) *Attorney, Agent, or Firm* — Elliot N. Kramsky

(57) ABSTRACT

A rotation rate sensor comprises a substrate and two structures which move relative to the substrate on a design plane (x-y), with the two moving structures being coupled to form a coupled structure such that the coupled structure has a first oscillation mode with antiphase deflections of the moving structures in a first direction (x) on the design plane (x-y) as excitation mode. The coupled structure has a second oscillation mode as a detection mode which is excited by Coriolis accelerations when the first oscillation mode is excited and on rotation about a sensitive axis (z) of the rotation rate sensor. The sensitive axis is at right angles to the design plane (x-y), and the coupled structure is designed such that, subject to optimal preconditions, it does not have any oscillation mode which can be excited by linear accelerations of the rotation rate sensor in a direction parallel to the second axis.

13 Claims, 8 Drawing Sheets

ROTATION RATE SENSOR

BACKGROUND

1. Field of the Invention

The present invention relates to rotation rate sensors.

2. Description of the Prior Art

WO 2005/066585 A1, WO 2005/066584 A1 and U.S. Pat. No. 6,605,164 describe rotation rate sensors (illustrated, for example in FIG. 7) that include an excitation unit 710, a sample mass 730 and a substrate, coupled by spring elements 711, 731 such that the excitation unit 710 can generally move relative to the substrate solely in the direction of a first axis (x axis). A sample mass 730 can move relative to the excitation unit 710 solely in the direction of a second axis (y axis) at right angles to the first axis (x).

Both axes lie on the substrate plane, i.e. the structures do not move at right angles to the substrate beyond manufacturing tolerances. Both force transmitters and taps are not required, by means of which forces can be applied in the z direction and movements can be measured in the z direction. This means that it is also possible to employ manufacturing methods by means of which such z force transmitters and z taps could not be produced.

During operation of the sensor, in the form of a Coriolis gyro, the excitation unit 710 excites a first oscillation in the direction of the first axis (x) (excitation mode). The sample mass 730 is moved (approximately) in this direction with the same amplitude and phase as the excitation unit 710. Force transmitters and taps 714 are provided for the excitation units 710. The excitation mode is excited by the excitation units preferably at its resonant frequency and with a velocity amplitude regulated to a fixed value.

When the Coriolis gyro is rotated about an axis (z) at right angles to the substrate plane, Coriolis forces act on the individual structures in the direction of the second axis (y). Because of the movement degrees of freedom described above, only the sample mass 730 can be deflected by the Coriolis forces. In this case, the sample mass 730 oscillates in the direction of the second axis (y) (referred to in the following text as the detection mode). The amplitude or deflection of the resultant oscillation of the sample mass 730 can be used as a measurement variable. Suitable taps 734, such as electrodes on the sample mass 730 with opposed electrodes anchored on the substrate, are required for this. Alternatively, the Coriolis force can be reset. Force transmitters are required for this. Forces can be applied to the sample mass 730 by the force transmitters (e.g., the electrode arrangement described above, in which the tap and the force transmitter functions can be selectively provided via common electrodes or separate electrodes). The amplitude of the resetting force is then a measure of angular velocity.

The cited documents also describe the ability, in each case, to arrange two of the gyro elements as described above alongside one another on a common substrate and to couple the two drive units and/or the two sample masses with additional spring elements.

WO 02/16871 A1 and U.S. Pat. No. 6,691,571 B2 describe gyros as rotation rate sensors (illustrated in FIG. 8), which have an excitation unit 810, a Coriolis element 820, a detection unit 830 and a substrate coupled by spring elements 811, 821, 831, 832 so that the excitation unit 810 can generally move relative to the substrate only in the direction of a first axis (x axis). The detection unit 830 can move relative to the substrate only in the direction of a second axis (y axis) at right angles to the first axis (x) and the Coriolis element 820 can move relative to the excitation unit 810 only in the direction of the second axis (y) and relative to the detection unit 830 only in the direction of the first axis (x). Both axes lie on the substrate plane, i.e. the structures do not move at right angles to the substrate within manufacturing tolerances. No force transmitters and taps are required, by means of which forces can be applied in the z direction and movements can be measured in the z direction. This means that it is also possible to use such manufacturing methods for production of the structures by which z force transmitters and z taps cannot be produced.

In order to operate the Coriolis gyro, the excitation unit 810 excites a first oscillation in the direction of the first axis (x) (excitation mode). The Coriolis element 820 is moved in this direction (approximately) with the same amplitude and phase as the excitation unit 810. The detection unit 830 is not moved in this approximate direction. Force transmitters and taps 814 are provided for excitation units 810. The excitation mode is excited by the force transmitters preferably at its resonant frequency with a velocity amplitude regulated at a fixed value.

When the Coriolis gyro is rotated about an axis (z axis) at right angles to the substrate plane, Coriolis forces act on moving structures in the direction of the second axis (y). Because of the movement degrees of freedom described above, only the Coriolis element 820 (and not the excitation unit 810) can be deflected by the Coriolis forces, with the detection unit 830 also moved. The Coriolis element 820, together with the detection unit 830, oscillates in the direction of the second axis (y) (referred to in the following text as the detection mode). The amplitude of the resultant detection mode can be used as a measurement variable. Suitable taps 834, such as electrodes on the detection unit 830 with opposed electrodes anchored to the substrate are required for this. The Coriolis force can be reset as an alternative. Force transmitters are required for this. Forces can be applied to the detection mode by the force transmitters (e.g., the electrode arrangement as described, in which the tap and force transmitter functions can be selectively carried out by common electrodes or separate electrodes). The amplitude of the resetting force is then a measure of the angular velocity. WO 02/16871 A1 and U.S. Pat. No. 6,691,571 B2 describe the ability to arrange two of the gyro elements as described above alongside one another on a common substrate, and to couple the two drive units, the two Coriolis elements or the two detection units by additional spring elements.

The sample masses and/or Coriolis elements and detection units are deflected to a relatively major extent by linear acceleration forces in the direction of the second axis, unless these forces are compensated by resetting forces in the prior art. Such "relatively major" deflection is possible due to the fact that the described coupled structures also have eigen modes (referred to in the following text as the "linear mode"), in which the sample masses and/or Coriolis elements and detection units move in phase in the direction of the second axis. The resonant frequency of this linear mode is lower than the resonant frequency $w_2$ of the detection mode. (The expression "relatively major" should be understood to mean that, in the case of a linear steady-state acceleration $\alpha$ in the direction of the second axis, the deflection x is either a few percent:

$$x = \frac{\alpha}{\omega_2^2} \tag{1}$$

or more ($\omega_2$ is the resonant frequency of the detection mode). The equation is exact for individual structures. For coupled structures without coupling of the sample masses and/or of the Coriolis elements/detection units, there may be either two independent detection modes, (with somewhat different resonant frequencies due to manufacturing tolerances) and/or weak coupling (e.g., due to the solid structure components having a stiffness which is not infinitely large). This can result in a small amount of common-mode/differential-mode splitting.)

When coupling is intentionally carried out by additional spring elements of the sample masses and/or the Coriolis elements and/or the detection units, the resonance of the detection mode of the individual structures is split into a common mode and a differential mode. The differential mode corresponds to the detection mode, and, in the relevant examples of the prior art, it has a higher resonant frequency than the common mode. The acceleration-dependent deflection is then greater than that given by equation (1).

Without resetting of linear acceleration forces, mentioned above, acceleration-dependent errors occur in the output signal. Such errors are compensated, although only partially, in the case of two coupled gyro units. Resetting reduces error signals, but requires appropriately designed force transmitters. In the case of electrostatic force transmitters, for example, the required size of the electrodes and/or the magnitude of the electrical voltages may have a disadvantageous effect on the mechanical characteristics of the sensor element and/or on the electronics (number of components, power loss, physical size).

Micromechanical gyro structures that have two coupled sample masses and in which the excitation and detection modes each correspond to a linear out-of-phase oscillation of the two sample masses on the substrate plane are known from M. F. Zaman, A. Sharma, and F. Ayazi, "High Performance Matched-Mode Tuning Fork Gyroscope", Proc. IEEE Micro Electromechanical Systems Workshop (MEMS 2006), Istanbul, Turkey, January 2006, pp. 66-69. The resonant frequencies of the detection and linear modes are identical to a first approximation, (i.e., linear accelerations cause relatively major deflection of the sample mass, leading to error signals).

Micromechanical gyro structures are known in which a detection mode responds to rotary oscillation. See, for example, P. Greiff, B. Boxenhorn, T. King, and L. Niles, "Silicon Monolithic Micromechanical Gyroscope", *Tech. Digest, 6th Int. Conf. on Solid-State Sensors and Actuators* (*Transducers '91*), San Francisco, Calif., USA, June 1991, pp. 966-968, and J. Bernstein, S. Cho, A. T. King, A. Kourepins, P. Maciel, and M. Weinberg, "A Micromachined Comb-Drive Tuning Fork Rate Gyroscope", *Proc. IEEE Micro Electromechanical Systems Workshop* (*MEMS 93*), Fort Lauderdale, Fla., USA, February 1993, pp. 143-148 or DE 19641284. It is possible to design structures such that the resonant frequency of the linear mode is considerably higher than the resonant frequency $\omega_2$ of the detection mode. The acceleration-dependent errors described above can therefore be largely suppressed. However, known structures require force transmitters and/or taps for applying forces in the z direction and for measuring movements in the z direction.

In all embodiments disclosed in WO 2005/066585 A1, WO 2005/066584 A1, U.S. Pat. No. 6,705,164 B2, WO 02/16871 A1 and U.S. Pat. No. 6,691,571 B2 having two coupled gyro structures, in which only the two excitation units (and not the sample masses or Coriolis element/detection units) are coupled, the resonant frequencies of the two sample masses and/or of the two Coriolis elements together with the respective detection units are split due to manufacturing tolerances. A large oscillation Q-factor of the detection modes must be achieved for high accuracy in a micromechanical gyro. The resonance (or 3 dB) width of the detection modes can be narrower than the splitting of the two resonant frequencies. For the so-called double-resonant operation required for high accuracies (in which the resonant frequency of the detection mode must be matched to that of the excitation mode), it is then necessary to tune both detection modes individually. In electronic tuning, both detection modes must then be detected and tuned, thus approximately doubling electronics complexity.

SUMMARY AND OBJECTS OF THE INVENTION

It is therefore an object of the invention to provide a rotation rate sensor in which deflection of the sample mass and/or of the Coriolis element, and of the detection unit in the event of linear accelerations in the direction of the second axis, is generally prevented, even without resetting.

It is a further object of the invention to achieve the preceding object with a rotation rate sensor needing no force transmitters and taps to apply forces in the z direction and to measure movements in the z direction.

It is yet a further object of the invention to provide a mechanical structure in which only one detection mode needs to be detected (and controlled) even when there are stringent requirements for accuracy and a high oscillation Q-factor.

The preceding and other objects are addressed by the present invention that provides a rotation rate sensor. Such sensor has a substrate and two individual structures which can move relative to the substrate on a design plane. The two individual structures are coupled to form a coupled structure.

The coupled structure has a first oscillation mode with out-of-phase deflections of the moving individual in a first direction on the design plane as an excitation mode. The coupled structure has a second oscillation mode as a detection mode, excited by Coriolis accelerations when the first oscillation mode is excited and during rotation about a sensitive axis. The second oscillation mode is at right angles to the design plane of the rotation rate sensor. The coupled structure has a detection resonant frequency.

The coupled structure is designed such that, subject to idealized preconditions, it has no oscillation mode that can be excited by linear accelerations of the rotation rate sensor in a direction parallel to a second direction on the design plane axis. Such second direction is at right angles to the first direction and to the sensitive axis.

The above and other features of the invention will become further apparent from the detailed description that follows. Such written description is accompanied by a set of drawing figures in which numerals, corresponding to numerals of the written description, point to the features of the invention. Like numerals refer to like features of the invention throughout both the written description and the drawing figures.

In some cases, identical parts in the figures are not provided with identical reference symbols to insure clarity. However, based on described symmetries and identical illustrations, one skilled in the art will appreciate which parts in the figures belong to which reference symbols.

The terms "comb drives" and "plate capacitor arrangements" should be understood, for the purpose of this application, as follows:

a "comb drive" is an arrangement of capacitors in the form of plates with "immersing" electrodes, i.e. the overlap of the electrodes changes. In general, the same electrode separations are chosen on both sides of an immersing electrode.

a "plate capacitor arrangement" is an arrangement of capacitors in the form of plates, in which electrode separation is changed during a movement. Possible implementations of this are, on the one hand, a different electrode separation on both sides of a moving electrode (when the intention is to mistune only the frequency, it is also possible to choose the same electrode separation) and, on the other hand, fixed electrodes on both sides of a moving electrode, are each at a different potential.

BRIEF DESCRIPTION OF THE DRAWING FIGURES

Figure 1:
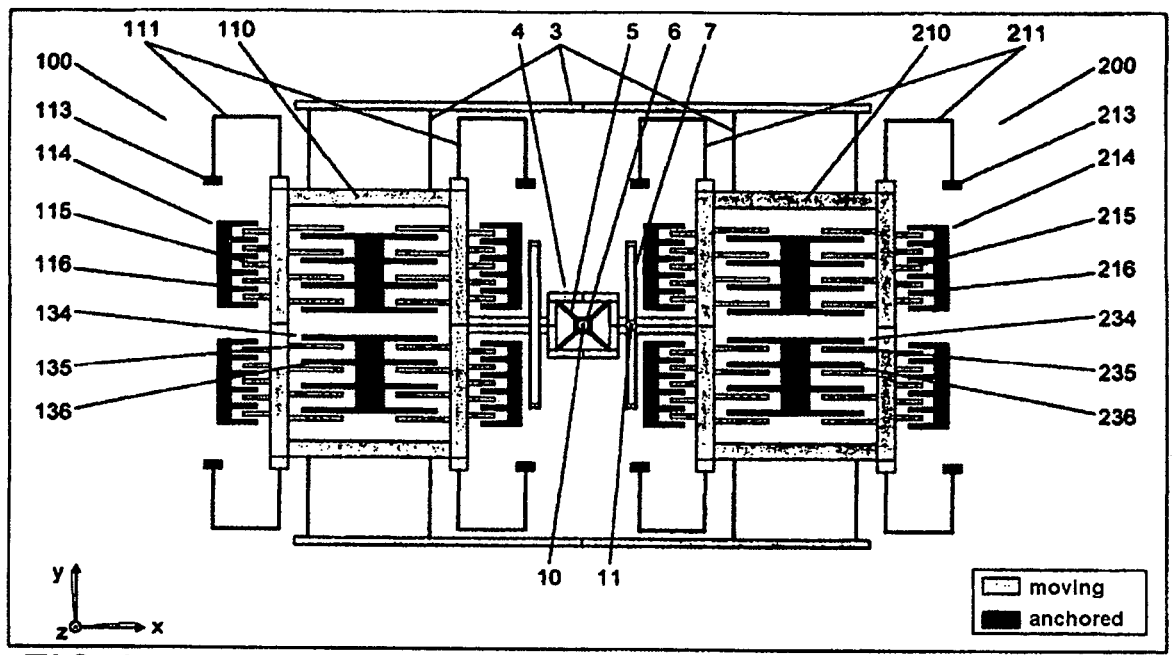
FIG. 1 is a schematic plan view of a first embodiment of a rotation rate sensor according to the invention.

The sensitive axis is at right angles to the plane of the drawing for all embodiments. The plane of the drawing is parallel to an x axis and a y axis, with the z axis being at right angles to this and therefore parallel to the sensitive axis. The substrate surface is parallel to the x axis and to the y axis, and therefore forms an x-y design plane.

All the components illustrated in light gray represent moving "mass elements". To a first approximation, such components can be considered to be infinitely stiff. Areas shown in dark gray basically cannot move relative to the substrate. Dashes represent bending beams used as components of spring elements. To a good approximation, bending beams are infinitely stiff in the longitudinal direction. If the extent of a bending beam in the z direction is considerably greater than that in the plane of the drawing at right angles to the longitudinal direction, the bending beams are considerably stiffer in the z direction than in the direction of the axis on the plane of the drawing at right angles to the longitudinal direction. The mass/moment of inertia of the bending beams and of mass elements which are part of a spring structure can frequently, to a good approximation, be ignored. Such approximations are used in the text, by way of example, with the indication "essentially".

DETAILED DESCRIPTION OF THE PREFERRED EMBODIMENT

In a first exemplary embodiment, shown in FIG. 1, a substrate (not illustrated) and two first individual structures 100, 200 are provided. The first individual structures 100, 200 have oscillating bodies 110, 210 attached to the substrate via first spring elements 111, 211 at first anchor points 113, 213. The first spring elements 111, 211 are soft in the x and y directions and as stiff as possible in the z direction. The two isolating bodies 110, 210 are coupled via coupling spring structures 3, a rotating spring element 4 and x rotating spring elements 7.

The coupling spring structure 3 is soft in the x direction and as stiff as possible in the z and y directions. The rotating spring element 4, comprising the bending beam 5 and the anchorage 6 on the substrate, is designed to be soft in the z direction (for torsion about its axis of symmetry 10) and stiff for all other loads. The x rotating spring element 7 is designed to be soft in the x and z directions for torsion about its axis of symmetry 11 and stiff for all other loads. In this variant, torsion of the x rotating spring element 7 is, however, suppressed by the arrangement (in particular the coupling spring structure 3). An x spring element, designed so that it is soft in the x direction and stiff for all other loads, can also be used instead of the x rotating spring element 7. This improves control of the excitation mode.

The excitation mode corresponds to a linear out-of-phase oscillation of the oscillating bodies 110, 210 in the direction of the x axis. The resonant frequency of the excitation mode is essentially governed by the mass of the oscillating bodies 110, 210 and the spring or rotating spring stiffnesses of the spring elements 111, 211, the coupling spring structures 3 and the x rotating spring elements 7.

The detection mode corresponds to a (common) rotary oscillation of the oscillating bodies 110, 210 about the axis of symmetry 10 in the z direction. The resonant frequency of the detection mode results from the moments of inertia of the oscillating bodies 110, 210 and the spring stiffnesses or rotating spring stiffnesses of the first spring elements 111, 211 and the rotating spring element 4.

The first individual structures 100, 200 have first force transmitters 114, 214 for exciting the excitation mode. The force transmitters are designed as taps for the excitation mode, or taps are provided. In the illustrated example, comb drives are shown as force transmitters. They comprise first moving excitation electrodes 115, 215, integrated in the oscillating bodies 110, 210, and first excitation electrodes 116, 216, anchored to the substrate. Comb drives can be used as force transmitters and as taps at the same time.

The first individual structures 100, 200 have first taps 134, 234 for detecting the detection mode. The taps are designed as force transmitters for compensation for the Coriolis force for resetting operation of these taps, or force transmitters must additionally be provided. In the illustrated example, plate capacitor arrangements, in which the plate separation changes during the detection movement, are shown as taps. The taps comprise first moving detection electrodes 135, 235, integrated in the oscillating bodies 110, 210, and first detection electrodes 136, 236, anchored to the substrate. Plate capacitor arrangements can be used as force transmitters and as taps at the same time.

In the first embodiment, the linear excitation mode is only controlled on the substrate plane. This means, inter alia, that, in the case of the illustrated example with first force transmitters 114, 214 with first stationary excitation electrodes 116, 216, disturbance forces can adversely affect the detection mode more severely than in the case of an excitation mode carried out a single direction. For example, a misalignment between the first force transmitters 114, 214 and the excitation mode can lead to large disturbance excitation of the detection mode. Additionally, in the illustrated example with first taps 134, 234 with first stationary detection electrodes 136, 236, error signals are detected when manufacturing tolerances allow error angles between the excitation movement and the taps. The first embodiment is therefore primarily of interest when using force transmitters and/or taps for the excitation mode, whose forces and signals do not depend significantly on the detection movement. Alternatively, it is of interest when using taps and/or force transmitters for the detection mode whose signals and forces do not depend significantly on the excitation movement.

Figure 2:
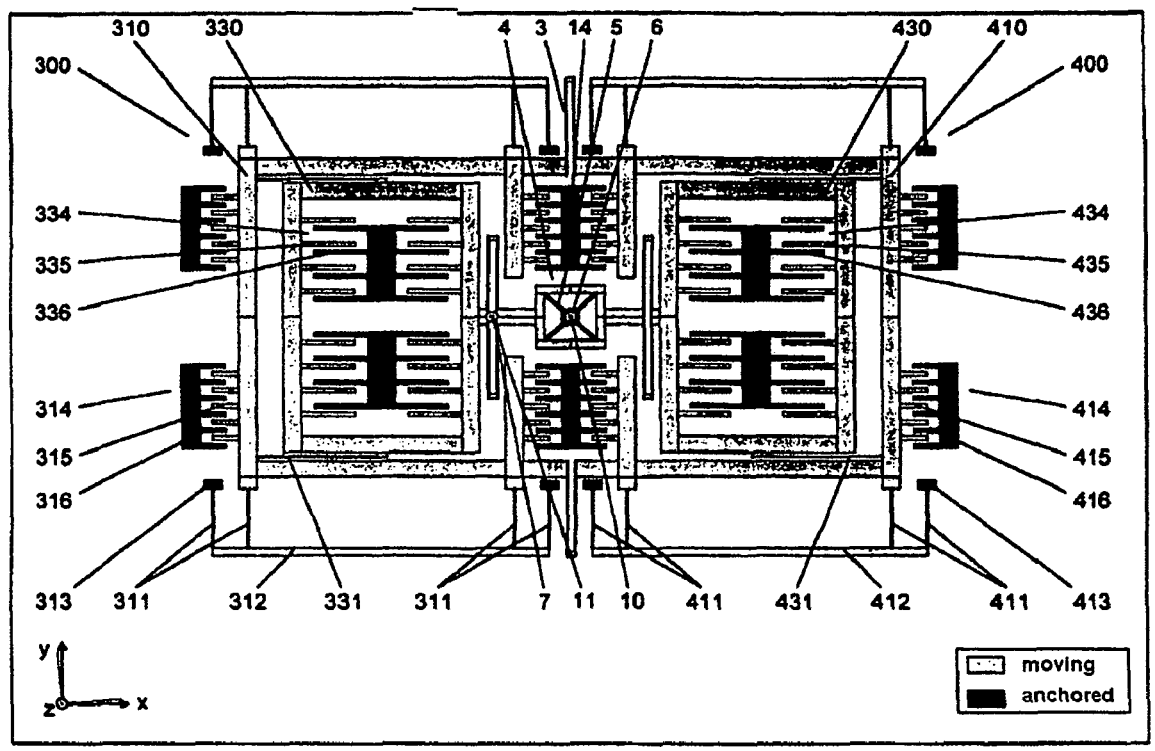
FIG. 2 is a schematic plan view of a second embodiment of a rotation rate sensor according to the invention.

The second embodiment illustrated in FIG. 2 has a substrate (not illustrated) and two second individual structures 300, 400. The second individual structures have first excitation units 310, 410, attached to the substrate via second spring elements 311, 411 at second anchor points 313, 413. Sample masses 330, 430 are connected to the first excitation units 310, 410 via y spring elements 331, 431. The first excitation units 310, 410 are directly coupled to the coupling spring structures 3. The sample masses 330, 430 are directly coupled to the rotating spring element 4 and to the x rotating spring elements 7.

The second spring elements 311, 411 are soft in the x direction and as stiff as possible in the y and z directions. They are connected to solid elements 312, 412 to improve guidance characteristics. The y spring elements 331, 431 are soft in the y direction and as stiff as possible in the x and z directions. The coupling spring structures 3 are designed to be soft in the x direction, stiff in the z direction, and as stiff as possible in the y direction. The rotating spring element 4, comprising the bending beam 5 and the anchorage 6 on the substrate, is designed to be soft in the z direction for torsion about its axis of symmetry 10, and stiff for all other loads. The x rotating spring element 7 is designed to be soft in the x direction and soft in the z direction for torsion about its axis of symmetry 11, but stiff for all other loads.

The excitation mode corresponds to a linear, out-of-phase oscillation of the first excitation units 310, 410 together with the sample masses 330, 430 in the direction of the x axis. The resonant frequency of the excitation mode essentially results from the mass of the first excitation units 310, 410 and of the sample masses 330, 430 as well as the spring stiffnesses and rotating spring stiffnesses of the second spring elements 311, 411, of the coupling spring structures 3 and of the x rotating spring elements 7.

The detection mode corresponds to a (common) "type of rotary oscillation" (i.e. a combination of rotary oscillation and out-of-phase linear oscillation) of the sample masses 330, 430 about their axis of symmetry 10 in the z direction, with the sample masses 330, 430 being guided, and not tilted, in the y direction by the y spring elements 331, 431. The resonant frequency of the detection mode results from the masses and moments of inertia of the sample masses 330, 430 and the spring stiffnesses and rotating spring stiffnesses of the y spring elements 331, 431, of the rotating spring element 4 and of the x rotating spring elements 7.

The second individual structures 300, 400 have second force transmitters 314, 414 for exciting the excitation mode. The second force transmitters 314, 414 are also taps for the excitation mode or taps must be provided. In the illustrated example, comb drives are shown as second force transmitters 314, 414. They comprise second moving excitation electrodes 315, 415, integrated in the first excitation units 310, 410, and second excitation electrodes, 316, 416, anchored on the substrate. In the illustrated example, the centrally arranged anchored excitation electrodes for the second force transmitters of the two second individual structures 300, 400 are combined to form a single force transmitter 14. This is not essential but reduces the number of required connections. The outer, second anchored excitation electrodes can also be combined, e.g., by corresponding conductor tracks. Comb drives can be used at the same time as both force transmitters and taps.

The second individual structures 300, 400 have second taps 334, 434 for detecting the detection mode. Such taps are either designed for the resetting mode as force transmitters for compensation for the Coriolis force, or force transmitters must be provided. In the illustrated example, plate capacitor arrangements are shown as second taps, with the plate separation changing during the detection movement. The second taps comprise second moving detection electrodes 335, 435, integrated in the sample masses 330, 430, and second detection electrodes 336, 436, anchored to the substrate. Plate capacitor arrangements can be used as force transmitters and taps at the same time.

In the second embodiment, the sample masses also carry out the excitation movement. This means that, in the illustrated example with second taps 334, 434 with second stationary detection electrodes 336, 436, error signals are detected when manufacturing tolerances produce error angles between the excitation movement and the second taps 334, 434. The second embodiment is therefore of particular interest when using taps whose signals do not depend on excitation movement.

Figure 3:
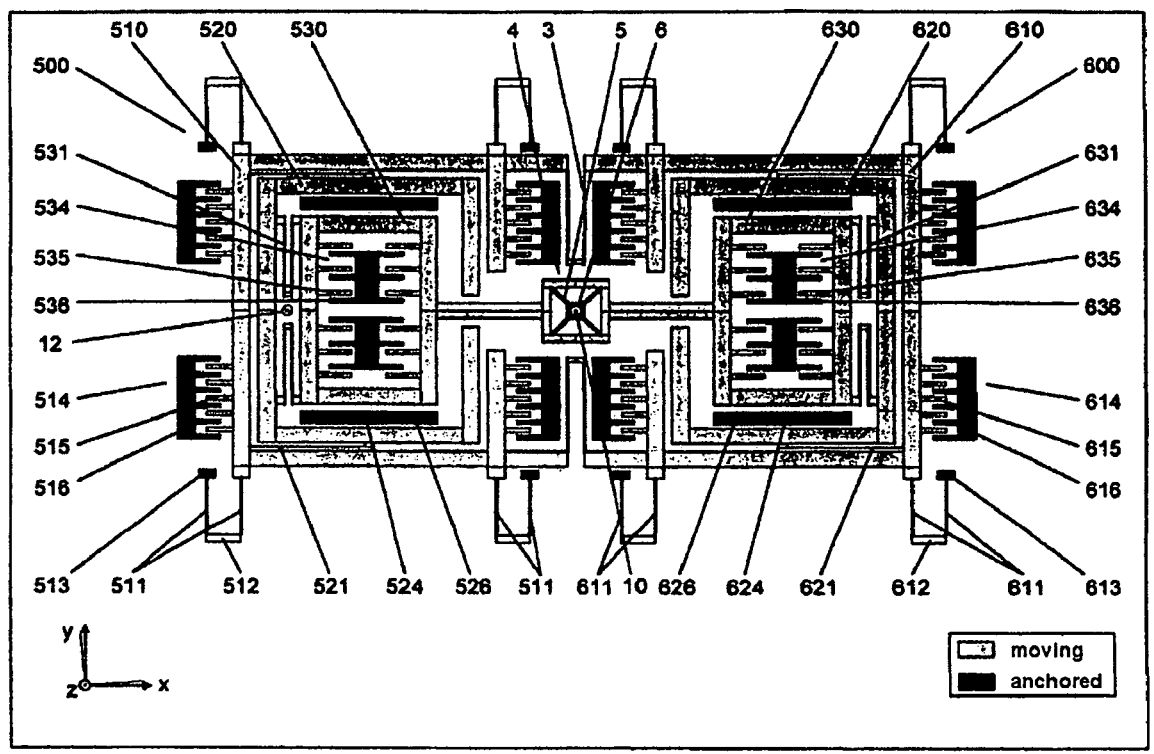
FIG. 3 is a schematic plan view of a third embodiment of a rotation rate sensor according to the invention.

The third exemplary embodiment, as shown in FIG. 3, has a substrate (not illustrated) and two third individual structures 500, 600. The third individual structures have second excitation units 510, 610 attached to the substrate via third spring elements 511, 611 at third anchor points 513, 613. Coriolis elements 520, 620 are connected to the second excitation unit 510, 610 via y spring elements 521, 621. Detection units 530, 630 are connected to the Coriolis elements 520, 620 via further x rotating spring elements 531, 631. The second excitation units 510, 610 are coupled directly to the coupling spring structures 3. The detection units 530, 630 are coupled directly to the rotating spring element 4.

The third spring elements 511, 611 are soft in the x direction and as stiff as possible in the y and z directions. They are connected to solid elements 512, 612 to improve guidance characteristics. The y spring elements 521, 621 are soft in the y direction, and as stiff as possible in the x and z directions. The other x rotating spring elements 531, 631 are designed to be soft in the x and z directions for torsion about their axis of symmetry 12 (of two individual spring elements arranged one above the other in the figure), but stiff for all other loads. Ideally, the other x rotating spring elements 531, 631 have the characteristic of a joint, which allows relative rotation and a change in the distance in the x direction between the Coriolis element and the detection unit at the same time.

The coupling spring structures 3 are designed to be soft in the x direction and stiff in the z and y directions. The rotating spring element 4, comprising the bending beam 5 and the anchorage 6 to the substrate, is soft in the z direction for torsion about its axis of symmetry 10 and stiff for all other loads.

The excitation mode corresponds to a linear, out-of-phase oscillation of the second excitation units 510, 610 together with the Coriolis elements 520, 620 in the direction of the x axis. The resonant frequency of the excitation mode essentially results from the mass of the second excitation units 510, 610 and the Coriolis elements 520, 620, and from the spring stiffnesses or rotating spring stiffnesses of the third spring elements 511, 611, the other x rotating spring elements 531, 631 and the coupling spring structures 3.

The detection mode corresponds to (common) rotary oscillation of the detection units 530, 630 about their axis of symmetry 10 in the z direction. The Coriolis elements 520, 620 carry out a type of rotary oscillation. They are guided in the y direction relative to the third excitation units 510, 610 by the y spring elements 521, 621, and can be rotated by the other x rotating spring elements 531, 631 with respect to the corresponding detection units 530, 630. The resonant frequency of the detection mode essentially results from the masses/moments of inertia of the Coriolis elements 520, 620 and the detection units 530, 630, as well as the spring stiffnesses and rotating spring stiffnesses, in particular of the rotary spring element 4, of the other x rotating spring elements 531, 631 and the y spring elements 521, 621.

The third individual structures 500, 600 have third force transmitters 514, 614 for exciting the excitation mode. These force transmitters are either taps for the excitation mode, or taps must be provided. In the illustrated example, comb drives are shown as third force transmitters 514, 614. These comprise third moving excitation electrodes 515, 615, integrated in the second excitation units 510, 610, and third detection electrodes 516, 616, anchored to the substrate. Comb drives can be used as force transmitters and as taps at the same time.

The third individual structures 500, 600 have third taps 534, 634 for detecting the detection mode. Such taps are either also designed as force transmitters for compensation for the Coriolis force for the reset mode, or force transmitters must additionally be provided. In the illustrated example, plate capacitor arrangements are shown as third taps 534, 634, with the plate separation changing during detection movement. The third taps 534, 634 comprise moving third detection electrodes 535, 635 integrated in the detection units 530, 630, and third detection electrodes 536, 636, anchored to the substrate. Plate capacitor arrangements can be used as force transmitters and as taps at the same time.

It should be emphasized that comb drives can also be used as taps (and as force transmitters) for the detection mode, since the detection units do not carry out the excitation movement. Plate capacitor arrangements, with a change in the plate separation as a tap for the detection mode, have the characteristic that the applied electrical voltage changes the resonant frequency of the detection mode. On one hand, this can be intentionally used to adjust frequency (to double resonance). On the other hand, the resonant frequency can be modulated, for example, by modulation signals for the tap function or by (rotation-rate-dependent) reset voltages. This disadvantage does not occur with comb drives. When using comb drives, plate capacitor arrangements can also be integrated with changes in the plate separation to make it possible to carry out the frequency adjustment described above.

It should also be noted that additional force transmitters, taps and/or apparatus for frequency tuning 524, 624 can also be provided for the Coriolis elements 520, 620. The illustrated example relates to plate capacitor arrangements with a change in plate separation. The arrangements comprise moving electrodes integrated in the Coriolis elements 520, 620, and tuning electrodes 526, 626 anchored to the substrate (only one electrode is illustrated in each case).

In the third embodiment, the combined detection units 530, 630 carry out a rotary oscillation together. In the illustrated example with three taps 534, 634 with stationary third electrodes 536, 636, this leads to the change in plate separation of the plate capacitor arrangements being position-dependent. This results in additional complexity of design and linearization. One other solution is to use the abovementioned comb drives as taps/force transmitters, for example, and to carry out frequency adjustment by means of the apparatus 524, 624.

Figure 4:
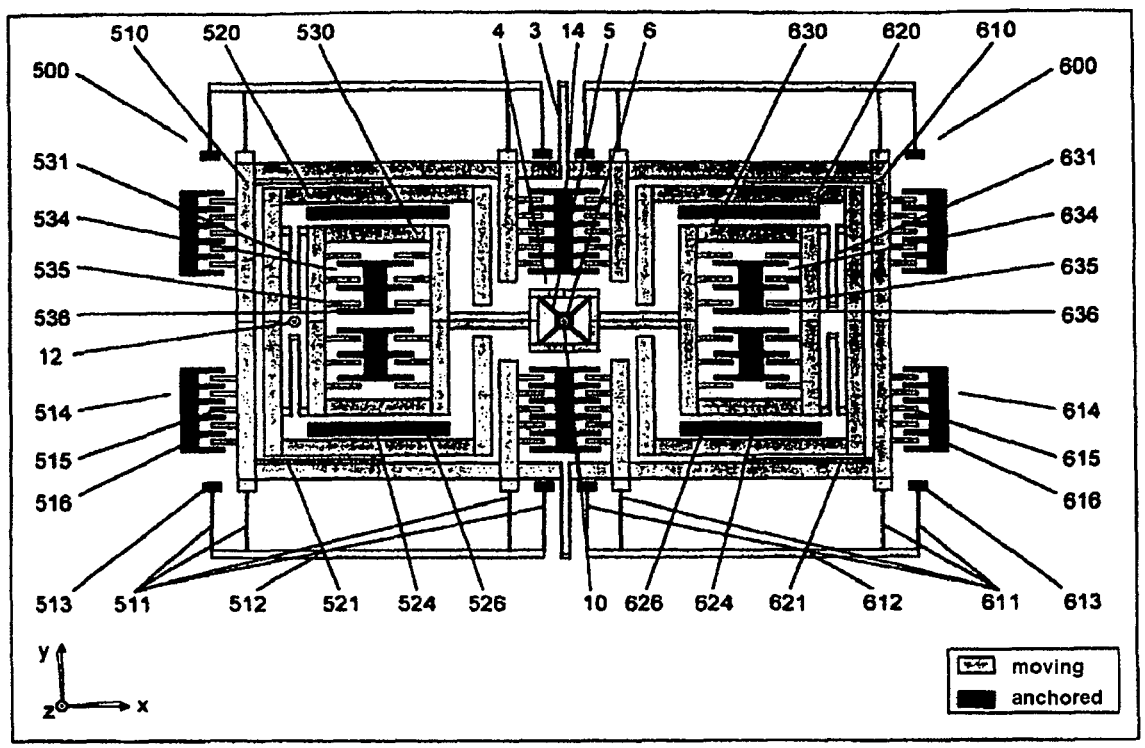
FIG. 4 is a schematic plan view of a fourth embodiment of a rotation rate sensor according to the invention.

The fourth embodiment, illustrated in FIG. 4, generally corresponds to the third embodiment, with the following modifications:

The solid elements 512, 612 are continuous, to further improve their characteristics.

The coupling spring structure 3 is folded outwards.

The centrally arranged anchored electrodes for the centrally arranged third force transmitters 514, 614 of the two third individual structures 500, 600 are, in each case, combined to form force transmitters 14, making it possible to reduce the number of connections.

Figure 5:
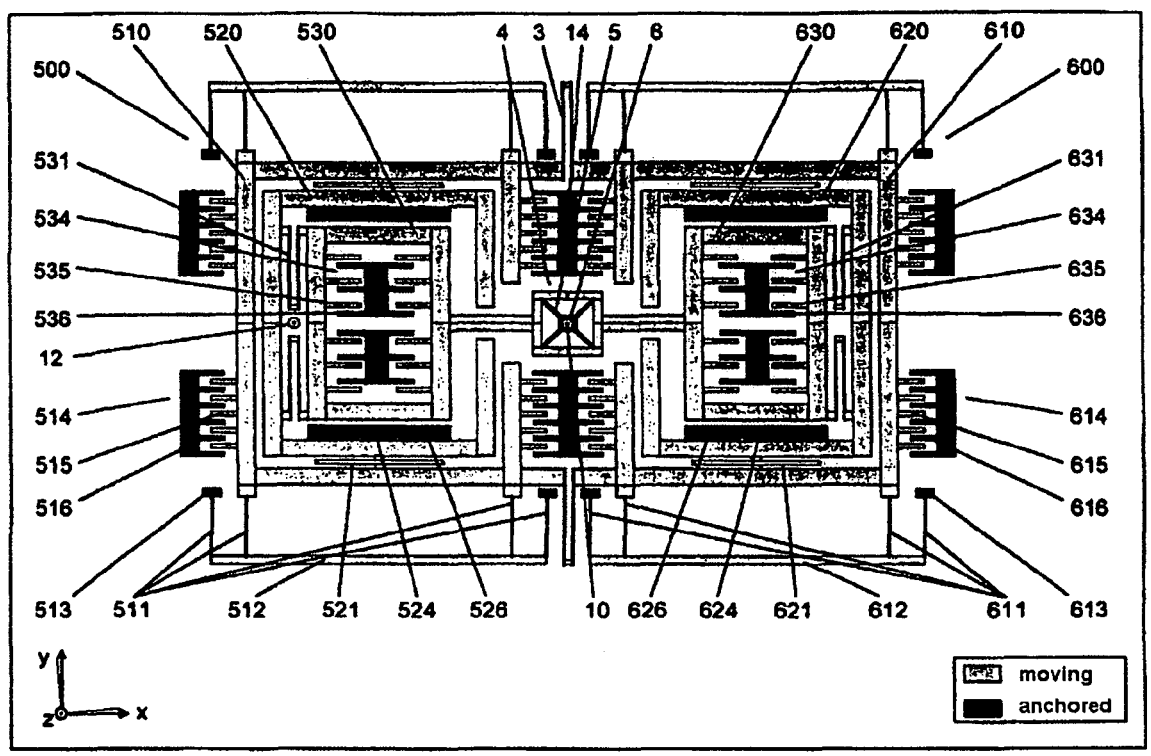
FIG. 5 is a schematic plan view of a fifth embodiment of a rotation rate sensor according to the invention.

The fifth embodiment, illustrated in FIG. 5, generally corresponds to the fourth embodiment, with the following modifications: The y spring elements 521, 621 that connect the excitation units 510, 610 to the Coriolis elements 520, 620 are modified. This results in the Coriolis elements 520, 620 being clamped on two sides, in contrast to the Coriolis elements 520, 620 being clamped on one side in the fourth exemplary embodiment (FIG. 4). Clamping on one side allows quadrature compensation, i.e., balancing by changing the excitation acceleration into the detection mode. However, the frequency of the detection mode is modulated by the excitation acceleration. When clamping on two sides, quadrature compensation is greatly reduced, but the quadrature terms are smaller, and the frequency of the detection mode is modulated to a lesser extent by the excitation acceleration. The x rotating spring elements 531, 631 also permit quadrature compensation to a lesser extent, and modulate the frequency of the detection mode. In the case of ideal x rotating spring elements with a negligibly low x stiffness, this effect disappears.

Figure 6:
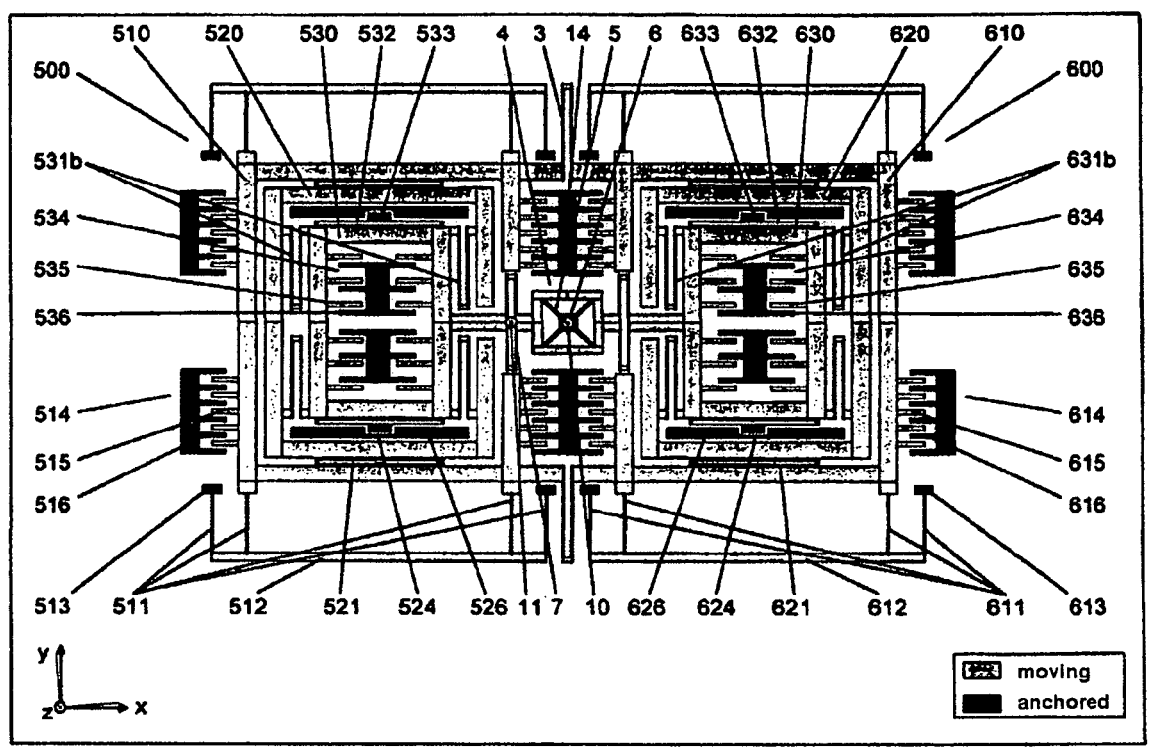
FIG. 6 is a schematic plan view of a sixth embodiment of a rotation rate sensor according to the invention.
Figure 7:
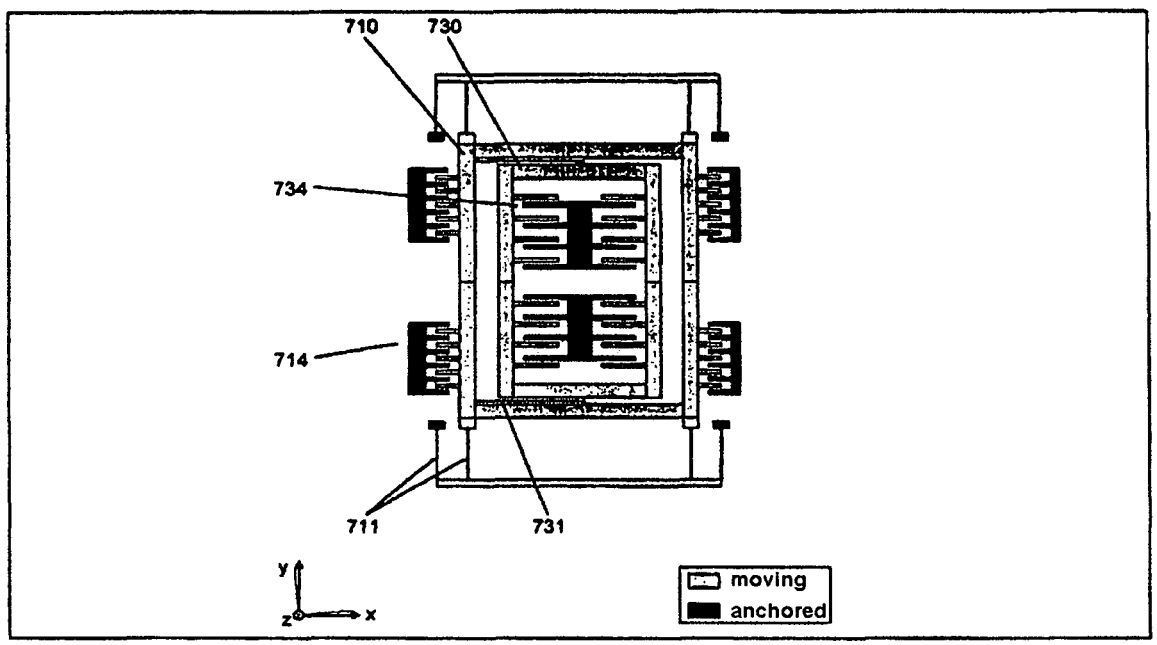
FIG. 7 is a schematic plan view of a rotation rate sensor in accordance with the prior art.
Figure 8:
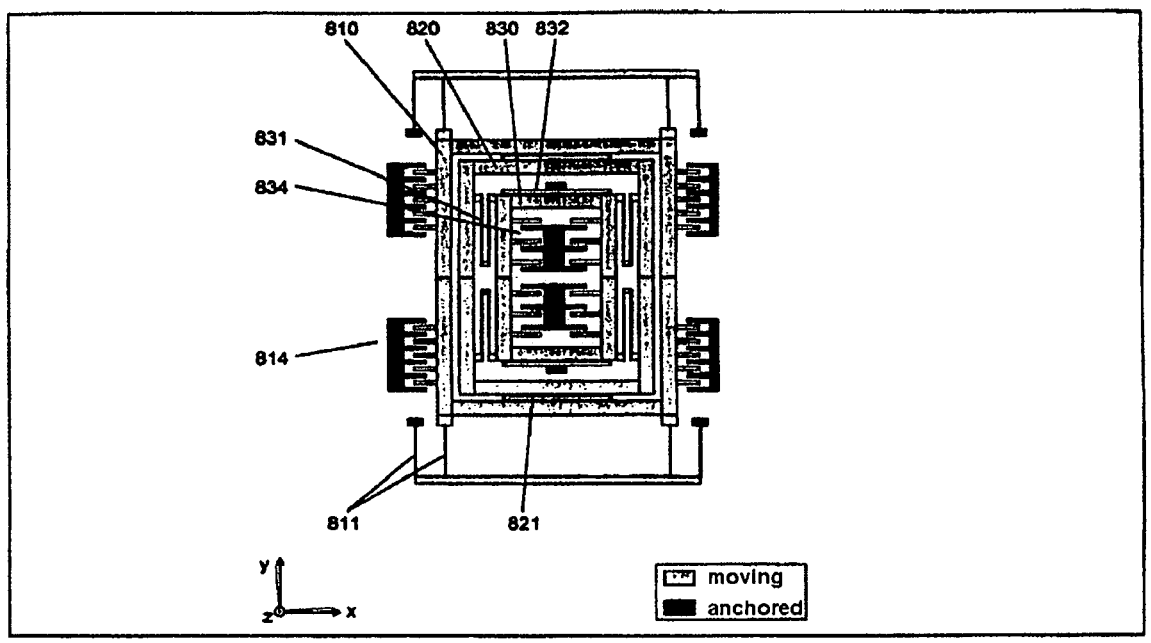
FIG. 8 is a schematic plan view of another rotation rate sensor in accordance with the prior art.

The sixth embodiment, as illustrated in FIG. 6, includes the following modifications from the fifth embodiment: The detection units 530, 630 are attached to the substrate via additional y spring elements 532, 632 at anchor points 533, 633. x rotating spring elements 7 are arranged between the rotating spring element 4 and the detection units 530, 630. The x spring elements 531b, 631b, which connect the detection units 530, 630 to the Coriolis elements 520, 620, can be two-sided, since they no longer need any "joint characteristic". The x spring elements 531b, 631b are soft in the x direction, but stiff for all other loads. The additional y spring elements 532, 632 are, combined, soft in the y direction, but are stiff for all other loads. The x rotation spring element 7 is soft in the x direction and in the y direction for torsion about its axis of symmetry 11, and stiff for all other loads. The resonant frequency of the excitation mode results from the mass of the second excitation units 510, 610 and the Coriolis elements 520, 620, as well as from the spring stiffnesses or rotation spring stiffnesses of the third spring elements 511, 611, of the x spring elements 531b, 631b, of the coupling spring structures 3, and of the x rotating spring elements 7.

The detection mode corresponds to a (common) type of rotary oscillation of the detection units 530, 630 and of the Coriolis elements 520, 620 about their axis of symmetry 10 in the z direction. As in the case of the third, fourth and fifth embodiments, the Coriolis elements 520, 620 move in approximately linear, out-of-phase oscillation in the y direction. In the sixth embodiment, the detection units 530, 630 are also guided in the y direction—by the additional y spring elements 532, 632. The y can rotate about the axis 11 relative to the rotating spring element 4, by means of the x rotating spring elements 7. Their movement therefore also approximately corresponds to a linear, out-of-phase oscillation in the y direction. The resonant frequency of the detection mode essentially results from the masses/moments of inertia of the Coriolis elements 520, 620 and the detection units 530, 630, and from the spring stiffnesses and rotating spring stiffnesses of the rotating spring element 4, of the x rotating spring elements 7, of the further y spring elements 532, 632 and of the y spring elements 521, 621, which connect the Coriolis elements 520, 620 to the excitation units 510, 610.

In contrast to the third, fourth and fifth embodiments, the sixth embodiment therefore avoids the detection units 530, 630 carrying out rotary oscillation together and, in the illustrated example with third taps 534, 634 with third stationary detection electrodes 536, 636, the change in plate separation of the plate capacitor arrangements being position-dependent. Furthermore, due to decoupling of the x rotating spring elements 7 from movement of the excitation mode by the x spring elements 531b and 631b, the quadrature terms become smaller and modulation of the frequency of the detection mode by the excitation acceleration is suppressed. This also means that quadrature compensation, as proposed for the previous embodiments, is impossible. By clamping the Coriolis elements 520, 620 on one side by means of the spring elements 521, 621 that clamp them on one side, as illustrated in FIG. 4, these effects can also be included in the embodiment of FIG. 6, and can be used for quadrature compensation.

Thus it is seen that the rotation rate sensor comprises a substrate and two individual structures which can move relative to the substrate on a design plane. There is coupling between the two moving individual structures, as a result of which the following features are accomplished:

The coupled structure has a first oscillation mode with out-of-phase deflections of the moving individual structures in a first direction of the design plane (excitation mode), The coupled structure has a second oscillation mode, which can be excited by Coriolis accelerations when the first oscillation mode is excited and during rotation about a sensitive axis, which is at right angles to the design plane, of the rotation rate sensor (detection mode), Subject to idealized preconditions (for example, the stiffness of the mass elements is infinitely large, ideal spring structures (for example, bending beams with infinite stiffness in the longitudinal direction) and negligibly small manufacturing tolerances), the coupled structure has no oscillation mode that can be excited by linear accelerations in a direction parallel to the second axis.

In actual conditions, it is necessary to insure that the resonant frequency of this linear mode is considerably higher than that of the detection mode (e.g. by a factor of about 1.4).

According to the invention, a detection mode such as this is advantageously achieved by a rotating spring element which couples the two individual structures to one another.

One simple implementation of a rotating spring element results, according to the invention, in the rotating spring element being formed from bending beams and an anchorage on the substrate symmetrically about an axis of symmetry, wherein the rotating spring element is soft for torsion about the axis of symmetry, and stiff for all other loads.

Further, according to the invention, rotary oscillation of the two individual structures, or at least parts thereof, about the sensitive axis is used as the detection mode. If the design is symmetrical and the manufacturing tolerances are negligible, rotary oscillation cannot be excited by a linear acceleration.

One particularly simple implementation results from the rotation rate sensor as claimed in which the individual structures comprise oscillating bodies coupled via the rotating spring element. This refinement is of interest when using force transmitters and/or taps for the excitation mode, whose forces and signals do not depend on the detection movement and/or when using taps and/or force transmitters for the detection mode which do not depend on the excitation movement.

Further advantageous refinements for detection modes which cannot be excited by linear accelerations result according to the invention in that the detection mode is an out-of-phase linear oscillation or a mixed form of an out-of-phase linear oscillation and a rotary oscillation. In this case, advantageously and according to the invention, x rotating spring elements are provided. The x rotating spring elements have the characteristic of a joint which at the same time allows relative rotation and change in distance in the x direction between its two points of action. This x rotating spring element allows rotary movements to be converted to linear movements.

The individual structures comprise excitation units and sample masses, wherein the excitation units are guided in a first direction, the sample masses are coupled via spring elements to the excitation units such that they can move relative to the excitation units only in a direction parallel to the substrate and at right angles to the first direction, and wherein the sample masses are coupled via the rotating spring element. This rotation rate sensor is of particular interest when using taps and/or force transmitters for the detection mode which do not depend on the excitation movement.

According to the invention, the individual structures comprise excitation units, Coriolis elements and detection units, wherein the excitation units are coupled via spring elements and the detection units are coupled via the rotating spring element. The use of y spring elements for anchorage of the detection units on the substrate avoids the detection units together carrying out a rotary oscillation and thus avoids the change in the plate separation of the plate capacitor arrangements being position-dependent when using plate capacitor arrangements as taps for the detection mode. In addition, no error signals are detected when manufacturing tolerances produce error angles between the excitation movement and the taps for the detection mode.

Plate capacitor arrangements with a change in plate separation as a tap for the detection mode according to the invention have the characteristic that the applied electrical voltage changes the resonant frequency of the detection mode. This can be deliberately used to adjust the frequency (to double resonance).

Comb drives as a tap for the detection mode avoid the modulations of the resonant frequency which occur in the case of plate capacitor arrangements by modulation signals for the tap function or by (rotation-rate-dependent) reset voltages.

When using comb drives as a tap, frequency adjustment can be carried out in a simple manner via separate tuning electrodes.

In order to operate the Coriolis gyro, the excitation mode is excited by means of a force transmitter. When the Coriolis gyro is rotated about the sensitive axis, Coriolis forces act, and can excite the detection mode. The amplitude of resultant oscillation can be used as a measurement variable. Suitable taps are provided for this purpose. Alternatively, the Coriolis force can be reset. Force transmitters are required for this purpose, by means of which moments and/or forces can be applied to the detection mode. The amplitude of the resetting moment or the resetting force is then a measure of the angular velocity. No force transmitters and taps are required for applying forces in the z direction or for measuring movements in the z direction.

While the invention has been disclosed with reference to its presently preferred embodiment, it is not limited thereto. Rather, this invention is limited only insofar as it is defined by the following set of patent claims and includes within its scope all equivalents thereof.

What is claimed is:

1. A rotation rate sensor having a substrate and two multipart individual structures which can move relative to the substrate on a design plane wherein the two individual structures are coupled to form a coupled structure such that the coupled structure has a first oscillation mode with antiphase deflections of the two moving individual structures in a first direction on the design plane as an excitation mode, the coupled structure has a second oscillation mode as a detection mode, which is excited by Coriolis accelerations when the first oscillation mode is excited and during rotation about a sensitive axis, which is at right angles to the design plane of the rotation rate sensor, characterized in that a rotating spring element is provided which is soft for torsion about an axis of symmetry which is parallel to the sensitive axis, is stiff for all other loads and couples the two individual structures to one another, such that parts of the individual structures carry out a common rotary oscillation about the axis of symmetry, wherein the detection mode comprises antiphase linear oscillation, transferred from the rotary oscillation, of parts of the two individual structures along a second direction, which is at right angles to the first direction.

2. The rotation rate sensor as claimed in claim 1 characterized in that
the rotating spring element comprises bending beams and an anchorage of the substrate, and is formed symmetrically about the axis of symmetry.

3. The rotation rate sensor as claimed in claim 1, characterized in that
the individual structures have excitation units and sample masses, wherein the excitation units can move only in the first direction and are coupled via coupling spring structures, and the sample masses are coupled via y spring elements to the excitation units,
and the y spring elements are stiff in the first direction and parallel to the sensitive axis, and are soft in the second direction, and
the sample masses are connected via x rotating spring elements to the rotating spring element, wherein the x rotating spring elements have an axis of symmetry which is parallel to the sensitive axis, are in each case provided between the individual structures and the rotating spring element, and are soft in the first direction and for torsion about the axis of symmetry, and stiff for all other loads.

4. The rotation rate sensor as claimed in claim 2, characterized in that
the individual structures comprise excitation units, coriolis elements and detection units, wherein the excitation units are coupled via coupling spring structures and the detection units are coupled via the rotating spring element and x rotating spring elements, and wherein the Coriolis elements are connected via y spring elements to the excitation units, and the detection units are connected via x spring elements to the Coriolis elements, and in that the individual structures have further y spring elements, by means of which the detection units are anchored on the substrate, wherein the further y spring elements are soft in the second direction, and are stiff for all other loads, wherein the x rotating spring elements have an axis of symmetry which is parallel to the sensitive axis, are in each case provided between the individual structures and the rotating spring element, and are soft in the first direction and for torsion about the axis of symmetry, and stiff for all other loads.

5. The rotation rate sensor as claimed in claim 1, characterized in that
the detection mode is a mixed form of the antiphase linear oscillation of parts of the two individual structures along the second direction and
of the rotary oscillation of other parts of the two individual structures about the sensitive axis.

6. The rotation rate sensor as claimed in claim 5, characterized in that
the individual structures comprise excitation units, Coriolis elements and detection units, wherein the Coriolis elements are connected via y spring elements to the excitation units, the excitation units are coupled via coupling spring structures, and the detection units are coupled via the rotating spring element, and
in that x rotating spring elements, which have an axis of symmetry which is parallel to the sensitive axis, are in each case provided between the Coriolis elements and the detection units, wherein the x rotating spring elements are soft in the first direction and for torsion about the axis of symmetry, and are stiff for all other loads.

7. The rotation rate sensor as claimed in claim 1, characterized in that
the individual structures have force transmitters for excitation of the excitation mode.

8. The rotation rate sensor as claimed in claim 1, characterized in that the individual structures have taps for the excitation mode.

9. The rotation rate sensor as claimed in claim 1, characterized in that the individual structures have taps for detection of the detection mode.

10. The rotation rate sensor as claimed in claim 9 characterized in that
the taps for detection of the detection mode are plate capacitor arrangements.

11. The rotation rate sensor as claimed in claim 9, characterized in that
the taps for detection of the detection mode are comb drives.

12. The rotation rate sensor as claimed in claim 1, characterized in that the individual structures have force tansmitters for resetting the detection mode.

13. The rotation rate sensor as claimed in claim 1, characterized in that
tuning electrodes are provided, in order to tune a resonant frequency of the individual structures.

* * * * *